US012785824B2

(12) United States Patent
Kirmaz et al.

(10) Patent No.: US 12,785,824 B2
(45) Date of Patent: Nov. 3, 2026

(54) BANDWIDTH BASED AND/OR SCENARIO BASED FEATURE SELECTION FOR HIGH LINE-OF-SIGHT/NON-LINE-OF-SIGHT CLASSIFICATION ACCURACY

(71) Applicant: Nokia Technologies Oy, Espoo (FI)

(72) Inventors: Anil Kirmaz, Munich (DE); Athul Prasad, Naperville, IL (US); Oana-Elena Barbu, Aalborg (DK); Taylan Sahin, Munich (DE); Diomidis Michalopoulos, Munich (DE); Dick Carrillo Melgarejo, Espoo (FI); Muhammad Ikram Ashraf, Espoo (FI)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 18/440,909

(22) Filed: Feb. 13, 2024

(65) Prior Publication Data

US 2024/0283551 A1 Aug. 22, 2024

(30) Foreign Application Priority Data

Feb. 16, 2023 (FI) ..................................... 20235180

(51) Int. Cl.
*H04B 17/309* (2015.01)
*H04W 64/00* (2009.01)

(52) U.S. Cl.
CPC .......... *H04B 17/309* (2015.01); *H04W 64/00* (2013.01)

(58) Field of Classification Search
CPC .... H04B 17/309; H04W 64/00; H04W 24/06; H04W 24/08
See application file for complete search history.

(56) References Cited

U.S. PATENT DOCUMENTS 10,908,299 B1 2/2021 Tadayon et al.
2022/0039048 A1* 2/2022 Khoryaev ............. G01S 5/0273
(Continued)

FOREIGN PATENT DOCUMENTS

WO 2023/287530 A1 1/2023
WO 2024/017516 A1 1/2024

OTHER PUBLICATIONS

"3rd Generation Partnership Project; Technical Specification Group Radio Access Network; LTE Positioning Protocol (LPP) (Release 17)", 3GPP TS 37.355, V17.3.0, Dec. 2022, pp. 1-348.
(Continued)

*Primary Examiner* — Habte Mered
(74) *Attorney, Agent, or Firm* — Barta Jones, PLLC

(57) ABSTRACT

A method performing by an apparatus, including: receiving (501), from a network entity or transmitting to a user device, one or more feature set lists each including a plurality of feature sets possibly in a priority order or rank order associated with the apparatus or the user device, wherein the one or more feature set lists are based on at least one of the following: one or more bandwidth parts configured for the apparatus or the user device, one or more bandwidth capabilities of the apparatus or the user device, or one or more radio environment scenarios; and classifying or selecting channel measurements of the one or more received signals per measurement by the apparatus or by the user device, to estimate a likelihood of a propagation condition classification including one of: line-of-sight (LOS), non-line-of-sight (NLOS) and obstructed line-of-sight, based on the feature sets to determine positioning of the apparatus or the user device.

19 Claims, 7 Drawing Sheets

(56) References Cited

U.S. PATENT DOCUMENTS

| | | | | |
|---|---|---|---|---|
| 2022/0095267 | A1* | 3/2022 | Shafin | G01S 5/0278 |
| 2022/0229143 | A1* | 7/2022 | Dwivedi | G01S 5/0236 |
| 2024/0215054 | A1* | 6/2024 | Haustein | H04W 4/20 |
| 2024/0236743 | A1* | 7/2024 | Yerramalli | H04B 7/063 |
| 2024/0389159 | A1* | 11/2024 | Lee | H04B 7/0695 |
| 2025/0056488 | A1* | 2/2025 | Alawieh | G01S 5/0278 |
| 2025/0063575 | A1* | 2/2025 | Mohammad Soleymani | G01S 11/02 |
| 2025/0133529 | A1* | 4/2025 | Peng | H04L 5/0048 |
| 2025/0142516 | A1* | 5/2025 | Hasegawa | H04W 64/00 |
| 2025/0151010 | A1* | 5/2025 | Hoang | G01S 1/0428 |
| 2026/0019124 | A1* | 1/2026 | Khan Beigi | H04B 7/0417 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.3.0, Dec. 2022, pp. 1-133.

"3rd Generation Partnership Project; Technical Specification Group Radio Access Network; NG-RAN; NR Positioning Protocol A (NRPPa) (Release 17)", 3GPP TS 38.455, V17.3.0, Dec. 2022, pp. 1-201.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"RAN1 Chair's Notes", 3GPP TSG RAN WG1 #109-e, May 9-20, 2022, 208 pages.

"Discussion summary #2 of [109-e-R18-AI/ML-08]", 3GPP TSG RAN WG1 Meeting #109-e, R1-2205498, Agenda: 9.2.4.2, vivo, May 9-20, 2022, pp. 1-63.

Ramadan et al., "NLOS Identification for Indoor Localization using Random Forest Algorithm", 22nd International ITG Workshop on Smart Antennas, Mar. 14-16, 2018, 5 pages.

Kirmaz et al., "LOS/NLOS Classification Using Scenario-Dependent Unsupervised Machine Learning", IEEE 32nd Annual International Symposium on Personal, Indoor and Mobile Radio Communications (PIMRC), Sep. 13-16, 2021, pp. 1134-1140.

"3rd Generation Partnership Project; Technical Specification Group Radio Access Network; NR; Physical layer measurements (Release 17)", 3GPP TS 38.215, V17.2.0, Sep. 2022, pp. 1-26.

Office Action received for corresponding Finnish Patent Application No. 20235180, dated Aug. 24, 2023, 14 pages.

"Views on LoS/NLOS Identification and Mitigation", 3GPP TSG RAN WG1 #105-e, R1-2105516, Agenda: 8.5.5, Nokia, May 10-27, 2021, 6 pages.

Office Action received for corresponding Finnish Patent Application No. 20235180, dated Jan. 11, 2024, 8 pages.

* cited by examiner

BANDWIDTH BASED AND/OR SCENARIO BASED FEATURE SELECTION FOR HIGH LINE-OF-SIGHT/NON-LINE-OF-SIGHT CLASSIFICATION ACCURACY

FIELD

The following example embodiments relate to wireless communication and to positioning.

BACKGROUND

A majority of time-based and angle-based positioning techniques anticipates a direct path, i.e., line-of-sight (LOS) propagation between transmission (TX) and receiving (RX). If the direct path is blocked and the signal arrives at the receiver from an indirect path, i.e., there may be a high probability to have a non-line-of-sight (NLOS) propagation, and the positioning accuracy will be degraded due to inaccurate ranging, or a wrong estimation of geometry for time-based and angle-based methods, respectively. Therefore it may be desirable to improve the positioning accuracy in order to estimate the location of the user device more accurately.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus including at least one processor, and at least one memory storing instructions which, when executed by the at least one processor, cause the apparatus at least to: receive from a network entity or transmit to a user device, one or more feature set lists, each includes a plurality of feature sets in a priority order or rank order associated with the apparatus or the user device, wherein the one or more feature set lists are based on at least one of the following: one or more bandwidth parts configured for the apparatus or the user device, one or more bandwidth capabilities of the apparatus or the user device, or one or more radio environment scenarios associated with the one or more network entity or the user device; and classify or select channel measurements of the one or more received signals per measurement by the apparatus or by the user device, to estimate a likelihood of a propagation condition classification includes one of: line-of-sight (LOS), non-line-of-sight (NLOS) and obstructed line-of-sight, based on the feature sets to determine positioning of the apparatus or the user device.

According to another aspect, there is provided an apparatus including: means for receiving, from a second network entity or transmitting to a user device, one or more feature set lists each includes a plurality of feature sets in a priority order or rank order associated with the first network entity or the user device, wherein the one or more feature set lists are based on at least one of the following: one or more bandwidth parts configured for the first network entity or the user device, one or more bandwidth capabilities of the first network entity or the user device, or one or more radio environment scenarios; and means for classifying or selecting channel measurements of the one or more received signals per measurement by the first network device or by the user device, to estimate a likelihood of a propagation condition classification including one of: line-of-sight (LOS), non-line-of-sight (NLOS) and obstructed line-of-sight, based on the feature sets to determine positioning of the first network entity or the user device.

According to another aspect, there is provided a method including performing by an apparatus, steps including: receiving, from a second network entity or transmitting to a user device, one or more feature set lists each includes a plurality of feature sets in a priority order or rank order associated with the first network entity or the user device, wherein the one or more feature set lists are based on at least one of the following: one or more bandwidth parts configured for the first network entity or the user device, one or more bandwidth capabilities of the first network entity or the user device, or one or more radio environment scenarios; and classifying or selecting channel measurements of the one or more received signals per measurement by the first network device or by the user device, to estimate a likelihood of a propagation condition classification including one of: line-of-sight (LOS), non-line-of-sight (NLOS) and obstructed line-of-sight, based on the feature sets to determine positioning of the first network entity or the user device.

According to another aspect, there is provided a computer program including instructions which, when executed by an apparatus, cause the apparatus to perform at least the following: receiving, from a second network entity or transmitting to a user device, one or more feature set lists each including a plurality of feature sets in a priority order or rank order associated with the first network entity or the user device, wherein the one or more feature set lists are based on at least one of the following: one or more bandwidth parts configured for the first network entity or the user device, one or more bandwidth capabilities of the first network entity or the user device, or one or more radio environment scenarios; and classifying or selecting channel measurements of the one or more received signals per measurement by the first network device or by the user device, to estimate a likelihood of a propagation condition classification including one of: line-of-sight (LOS), non-line-of-sight (NLOS) and obstructed line-of-sight, based on the feature sets to determine positioning of the first network entity or the user device.

According to another aspect, there is provided an apparatus including at least one processor, and at least one memory storing instructions which, when executed by the at least one processor, cause the apparatus at least to: determine one or more feature set lists based on at least one of the following: one or more bandwidth parts configured for one or more network entity or user device, one or more bandwidth capabilities of the one or more network entity or user device, or one or more radio environment scenarios associated with the one or more network entity or the user device, wherein the one or more feature set lists include a plurality of feature sets in a priority order or rank order; and transmit the one or more feature set lists to the one or more network entity or the user device, wherein a feature set of the plurality of feature sets includes one or more radio channel features.

According to another aspect, there is provided an apparatus including: means for determining one or more feature set lists based on at least one of the following: one or more bandwidth parts configured for one or more user devices, one or more bandwidth capabilities of the one or more user devices, or one or more radio environment scenarios associated with the one or more user devices, wherein the one or more feature set lists include a plurality of feature sets in a priority order or rank order; and means for transmitting the one or more feature set lists to the one or more user devices, or to a network entity, wherein a feature set of the plurality of feature sets includes one or more radio channel features.

According to another aspect, there is provided a method including performing by an apparatus, steps including: determining one or more feature set lists based on at least one of the following: one or more bandwidth parts configured for one or more user devices, one or more bandwidth capabilities of the one or more user devices, or one or more radio environment scenarios associated with the one or more user devices, wherein the one or more feature set lists include a plurality of feature sets in a priority order or rank order; and transmitting the one or more feature set lists to the one or more user devices, or to a network entity, wherein a feature set of the plurality of feature sets includes one or more radio channel features.

According to another aspect, there is provided a computer program including instructions which, when executed by an apparatus, cause the apparatus to perform at least the following: determining one or more feature set lists based on at least one of the following: one or more bandwidth parts configured for one or more user devices, one or more bandwidth capabilities of the one or more user devices, or one or more radio environment scenarios associated with the one or more user devices, wherein the one or more feature set lists include a plurality of feature sets in a priority order or rank order; and transmitting the one or more feature set lists to the one or more user devices, or to a network entity, wherein a feature set of the plurality of feature sets includes one or more radio channel features.

According to another aspect, there is provided a user device, including at least one processor, and at least one memory storing instructions which, when executed by the at least one processor, cause the apparatus at least to: receive from a network entity, one or more feature set lists, each including a plurality of feature sets in a priority order or rank order, associated with the user device, wherein the one or more feature set lists are based on at least one of the following: one or more bandwidth parts configured for the user device, one or more bandwidth capabilities of the user device, or one or more radio environment scenarios associated with the user device; and classify or select channel measurements of the one or more received signals per measurement to estimate a likelihood of a propagation condition classification including one of: line-of-sight (LOS), non-line-of-sight (NLOS) and obstructed line-of-sight, based on the feature sets to determine positioning of the user device.

According to another aspect, there is provided a user device, including: means for receiving from a network entity, one or more feature set lists, each including a plurality of feature sets in a priority order or rank order, associated with the user device, wherein the one or more feature set lists are based on at least one of the following: one or more bandwidth parts configured for the user device, one or more bandwidth capabilities of the user device, or one or more radio environment scenarios associated with the user device; and means for classifying or select channel measurements of the one or more received signals per measurement to estimate a likelihood of a propagation condition classification including one of: line-of-sight (LOS), non-line-of-sight (NLOS) and obstructed line-of-sight, based on the feature sets to determine positioning of the user device.

According to another aspect, there is provided a method including performing by a user device, steps including: receiving from a network entity, one or more feature set lists, each including a plurality of feature sets in a priority order or rank order, associated with the user device, wherein the one or more feature set lists are based on at least one of the following: one or more bandwidth parts configured for the user device, one or more bandwidth capabilities of the user device, or one or more radio environment scenarios associated with the user device; and classifying or select channel measurements of the one or more received signals per measurement to estimate a likelihood of a propagation condition classification including one of: line-of-sight (LOS), non-line-of-sight (NLOS) and obstructed line-of-sight, based on the feature sets to determine positioning of the user device.

According to another aspect, there is provided a non-transitory computer readable medium including program instructions which, when executed by a user device, cause the user device to perform at least the following: receiving from a network entity, one or more feature set lists, each including a plurality of feature sets in a priority order or rank order, associated with the user device, wherein the one or more feature set lists are based on at least one of the following: one or more bandwidth parts configured for the user device, one or more bandwidth capabilities of the user device, or one or more radio environment scenarios associated with the user device; and classifying or select channel measurements of the one or more received signals per measurement to estimate a likelihood of a propagation condition classification including one of: line-of-sight (LOS), non-line-of-sight (NLOS) and obstructed line-of-sight, based on the feature sets to determine positioning of the user device.

LIST OF DRAWINGS

In the following, various example embodiments will be described in greater detail with reference to the accompanying drawings, in which FIG. 1 illustrates an example embodiment of a cellular communication network;

Figure 4A:
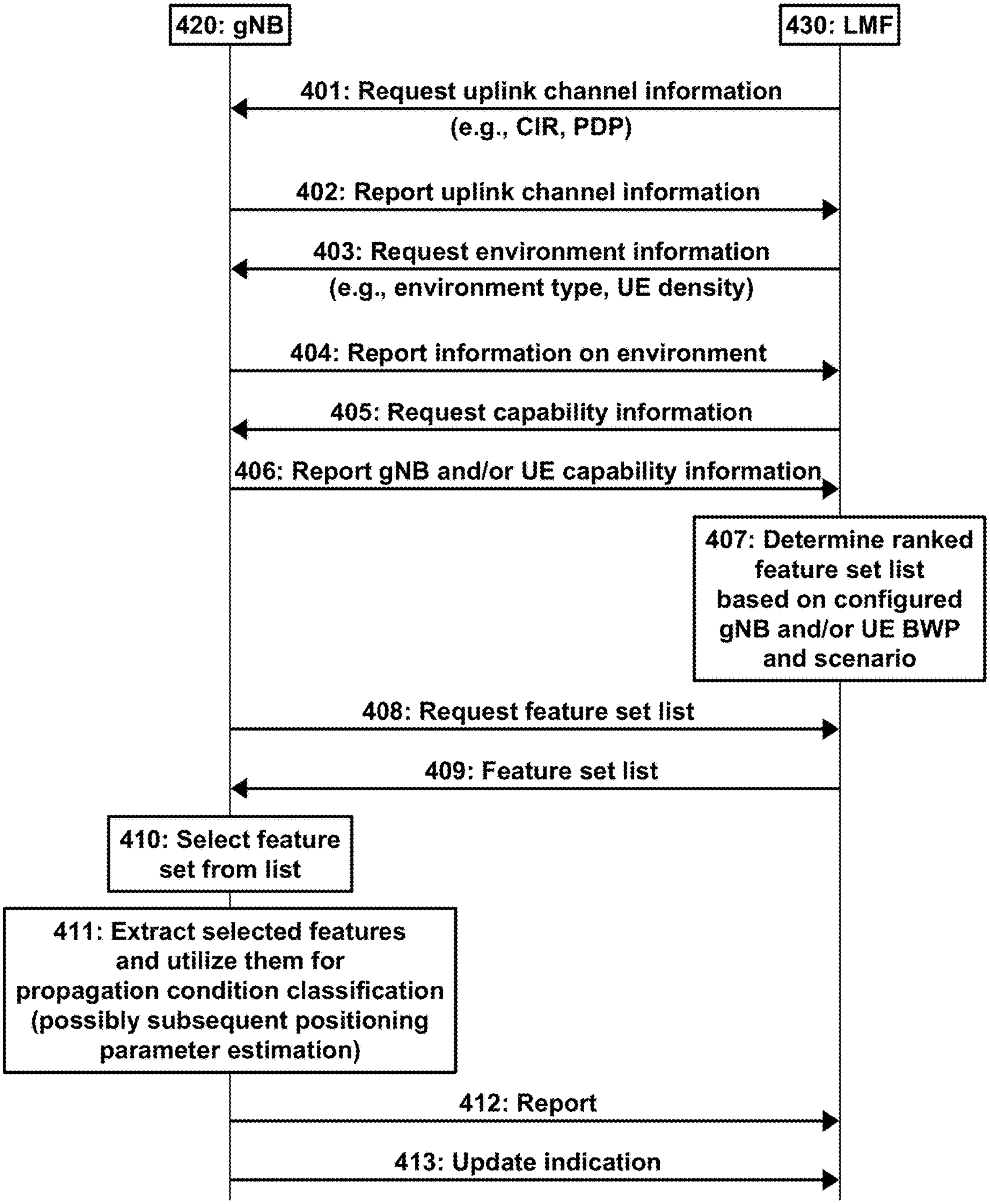
Figure 4B:
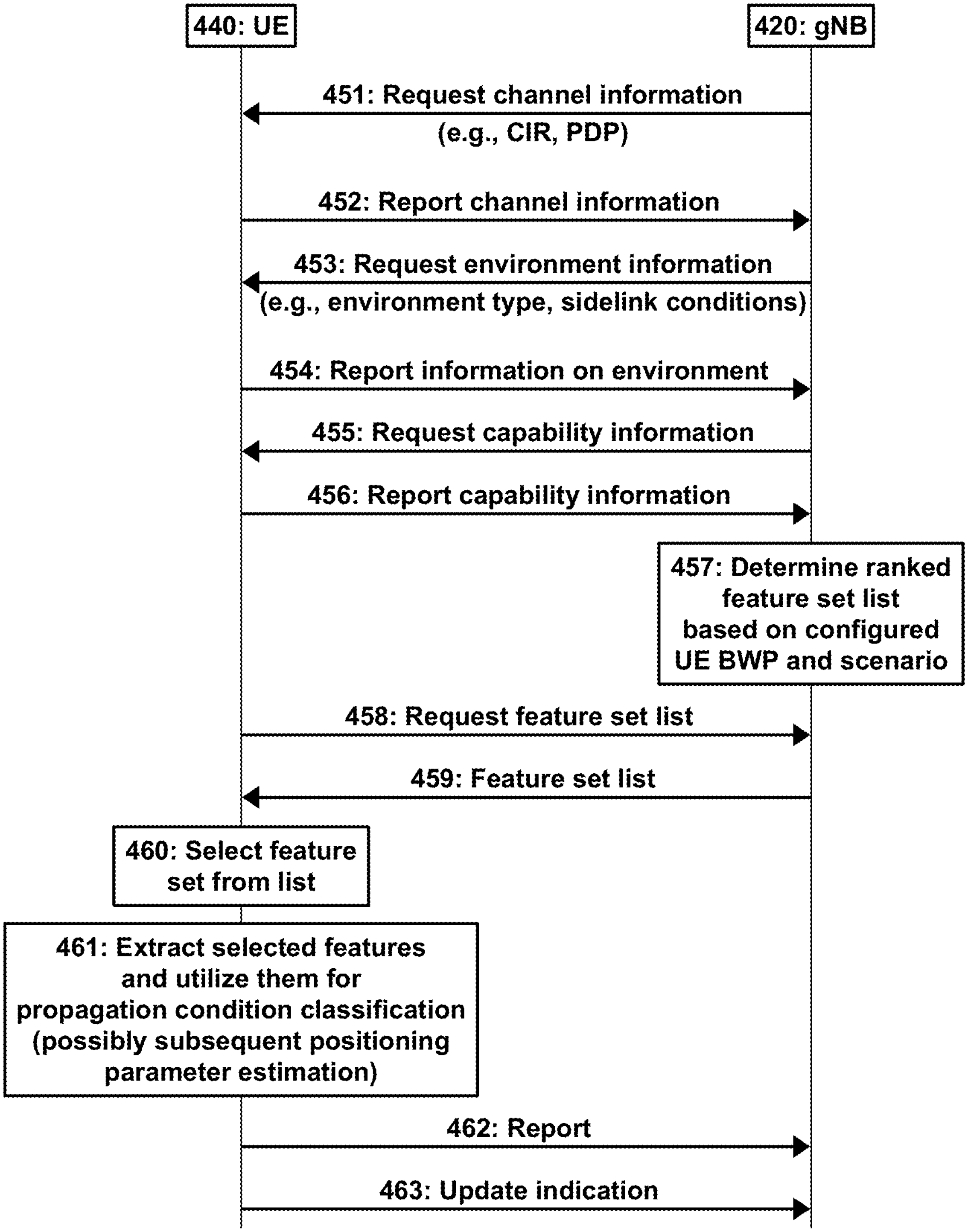
Figure 5:
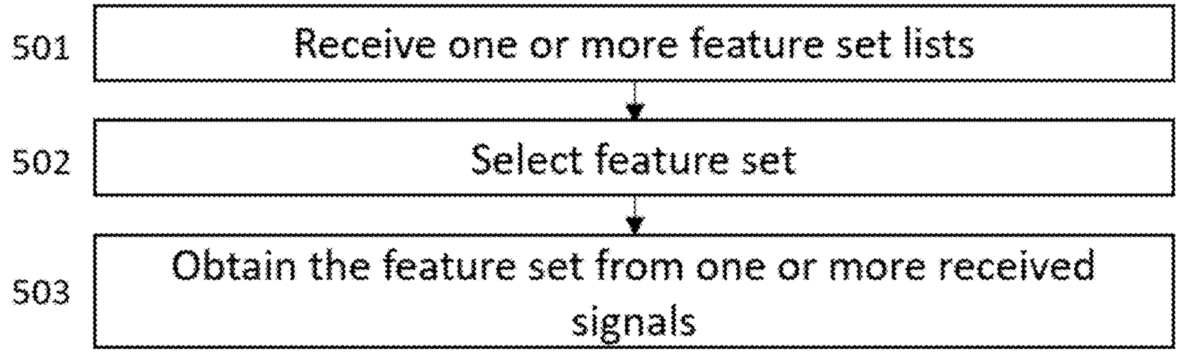
Figure 6:
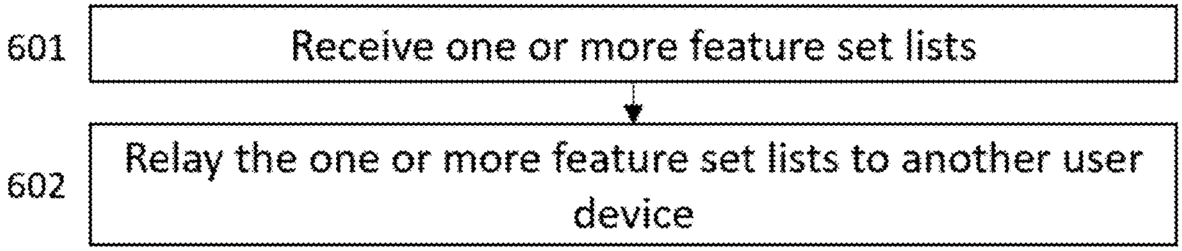
Figure 7:
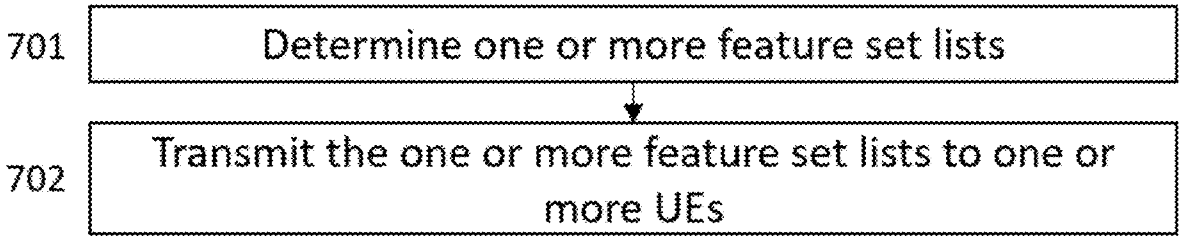
Figure 8:
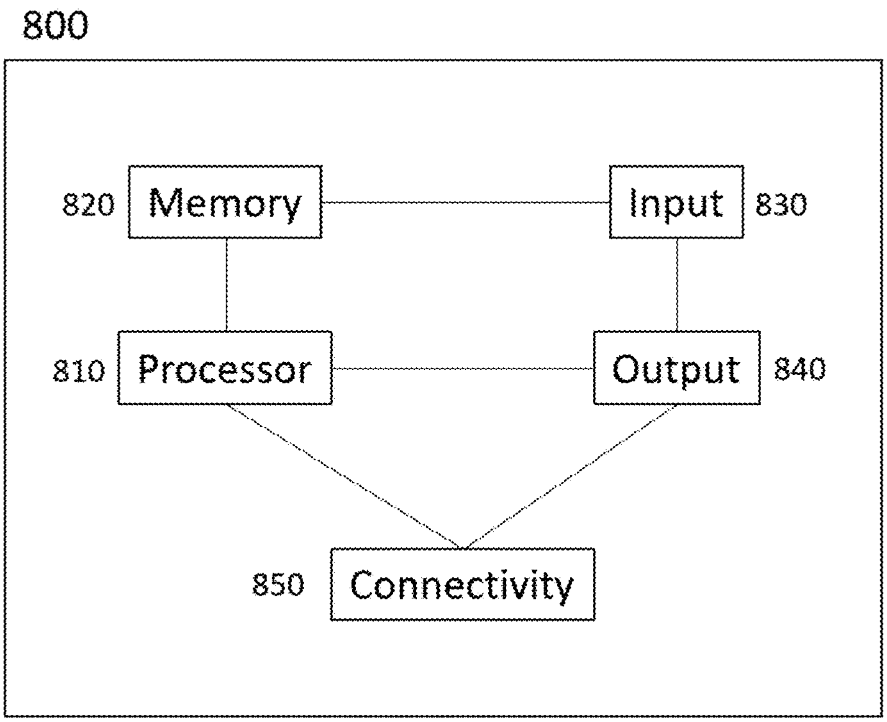

FIGS. 4A and 4B each illustrates a signaling diagram according to an example embodiment;

FIG. 5 illustrates a flow chart according to an example embodiment;

FIG. 6 illustrates a flow chart according to an example embodiment;

FIG. 7 illustrates a flow chart according to an example embodiment;

FIG. 8 illustrates an example embodiment of an apparatus; and

Figure 9:
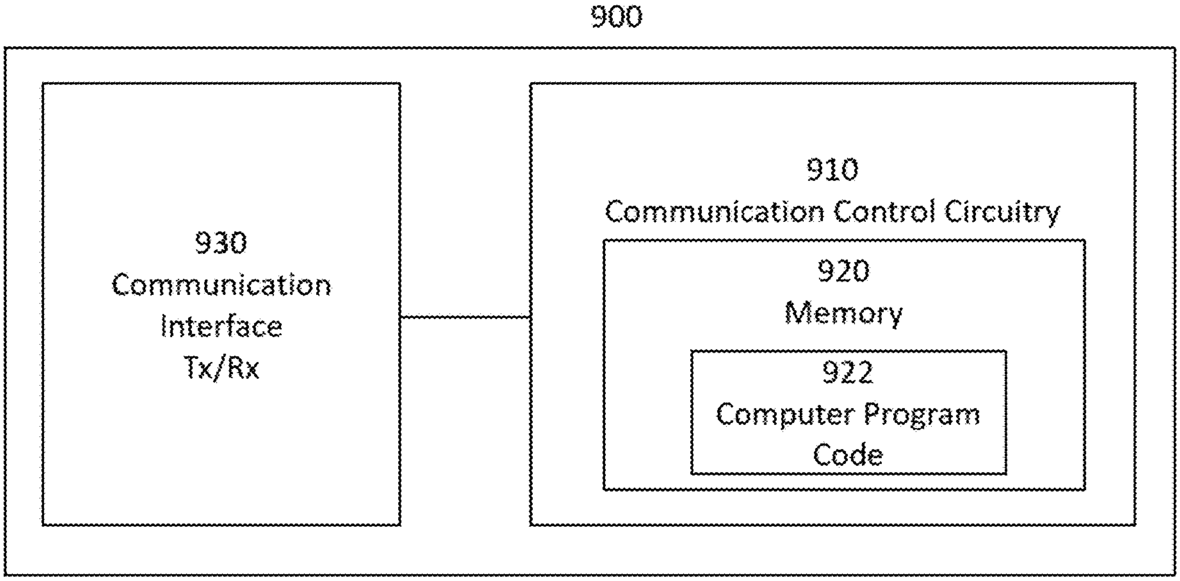

FIG. 9 illustrates an example embodiment of an apparatus.

DETAILED DESCRIPTION

The following embodiments are exemplifying. Although the specification may refer to “an”, “one”, or “some” embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
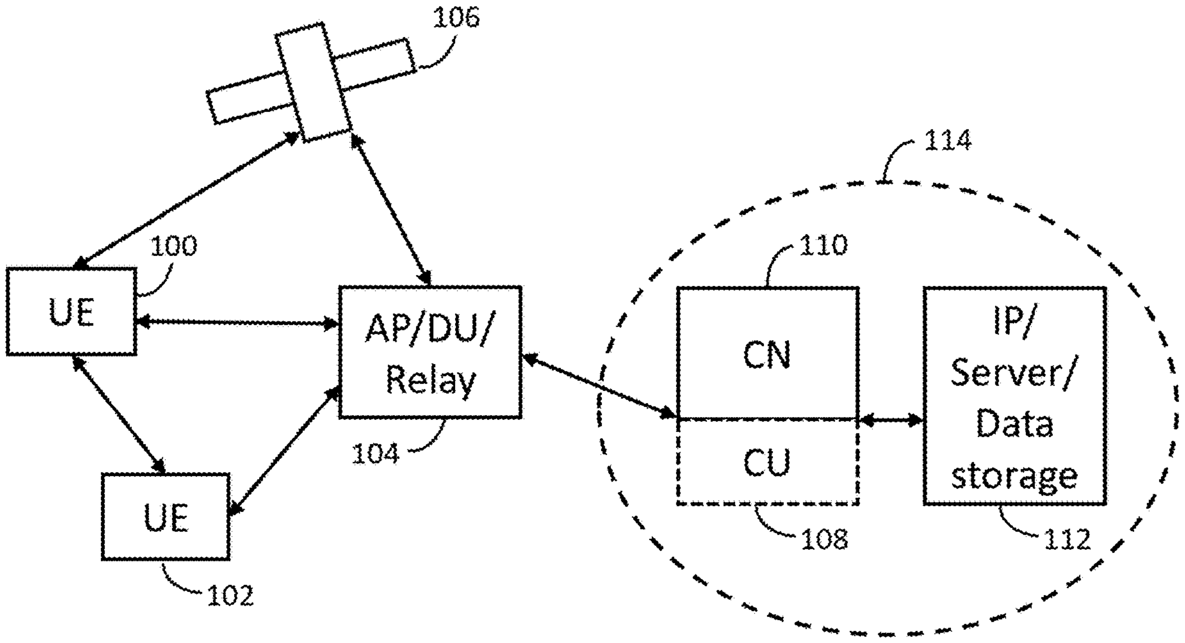

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also include other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may include more than one access node, in which case the access nodes may also be configured to communicate with one another over links, wired or wireless, designed for the purpose. These links may be used for signaling purposes. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may include a plurality of antennas or antenna elements. The access node may further be connected to a core network 110 (CN or next generation core NGC). Depending on the system, the counterpart on the CN side may be a serving gateway (S-GW, routing and forwarding user data packets), packet data network gateway (P-GW) for providing connectivity of user devices to external packet data networks, user plane function (UPF), mobility management entity (MME), access and mobility management function (AMF), or location management function (LMF), etc.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may include two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may include a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also include a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node including radio parts. It may also be possible that node operations are distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may include a plurality of access nodes, the user device may have access to a plurality of radio cells and the system may also include other apparatuses, such as physical layer relay nodes or other network elements, etc. At least one of the access nodes may be a Home eNodeB or a Home gNodeB.

Furthermore, the access node may also be split into: a radio unit (RU) including a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be included in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node. The operation of the DU may be at least partly controlled by the CU. The CU may include a control plane (CU-CP), which may be defined as a logical node hosting the RRC and the control plane part of the PDCP protocol of the CU for the access node. The CU may further include a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned access node units, or different core network operations and access node operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Positioning techniques may be used to estimate a physical location of a user device. Herein the user device to be positioned is referred to as a target UE. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT).

In wireless positioning, multiple positioning anchors in known locations may transmit and/or receive one or more positioning reference signals (PRS) to/from the target UE. For example, multilateration techniques may then be used to localize (i.e., position) the target UE with respect to the positioning anchors. The positioning anchors may also be referred to as anchors, multilateration anchors, or reference points herein. The positioning anchors may be, for example, radio access nodes (in uplink/downlink positioning) or other UEs (in sidelink positioning).

Figure 2:
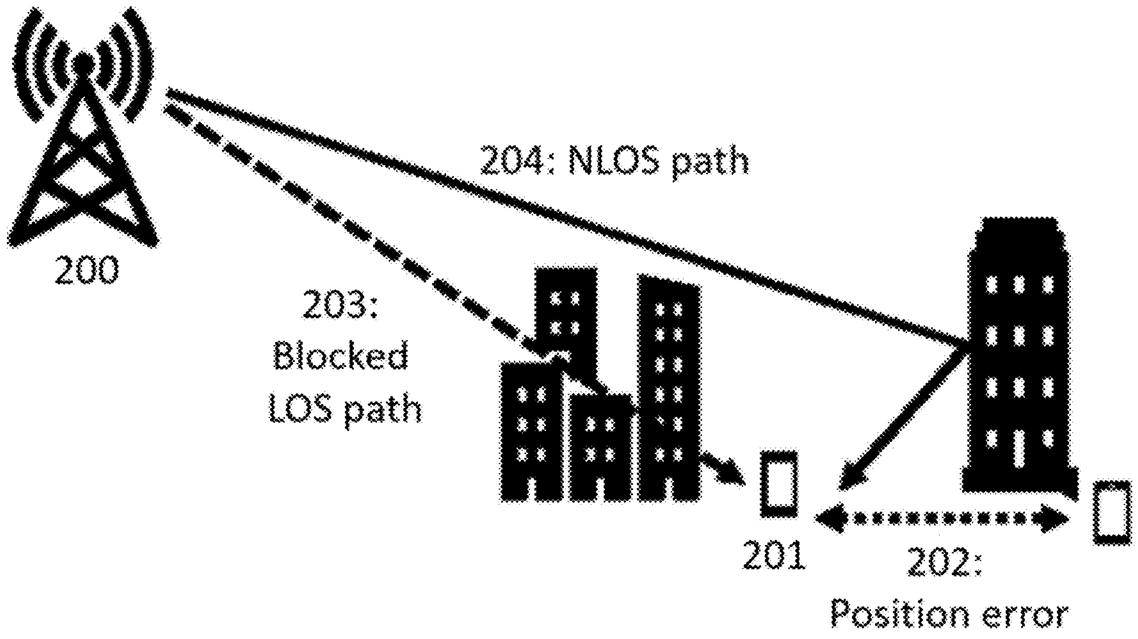
FIG. 2 illustrates an example of positioning error due to non-line-of-sight propagation.

FIG. 2 illustrates an example of positioning error 202 of a UE 201 due to non-line-of-sight propagation. Most time-based and angle-based positioning techniques anticipate a direct path 203, i.e., line-of-sight (LOS) propagation between transmitter 200 and receiver 201. If the direct path 203 is blocked and the signal arrives at the receiver from an indirect path 204, i.e., there is a high probability to have a non-line-of-sight (NLOS) propagation, the positioning accuracy may be degraded due to inaccurate ranging (as illustrated in FIG. 2), or an incorrect estimation of geometry for time-based and angle-based techniques, respectively.

Therefore, classifying the channel measurements as LOS/NLOS may enhance the positioning performance. In other words, LOS/NLOS classification may be used to differentiate LOS channels from NLOS channels. Such classification outcome can be used in many ways during the position estimation, for example by disregarding NLOS measurements and prioritizing LOS measurements for selecting clean distance information.

Artificial intelligence (AI) or machine learning (ML) based LOS/NLOS identification may be used to provide positioning accuracy enhancement. In direct AI/ML positioning, the output of the AI/ML model inference is the UE location. For this positioning method, measurements conducted by the UE at various locations within the network could be utilized to build a comprehensive dataset that may be used to train a machine learning model that can predict the UE location.

In AI/ML assisted positioning, the output of the AI/ML model inference is new measurement and/or enhancement of existing measurement. These new measurements and/or enhancement of existing measurement may then be used to determine the UE location, which could achieve higher accuracy than legacy approaches.

In the context of AI/ML for positioning accuracy enhancement, sub use cases can be specified by the input and output of AI/ML models.

Some example embodiments may provide a procedure to improve AI/ML-based LOS/NLOS classification accuracy through determining (or specifying) the most suitable input to the AI/ML classifier, thus facilitating high-accuracy positioning. For example, features extracted from channel impulse response (CIR) or some other signal properties may be used as the input for AI/ML models.

The complex nature of a radio environment leads to difficulty in modelling radio propagation conditions accurately. Therefore, data-driven techniques and machine learning may provide a solution to solve the LOS/NLOS classification problem. The classification algorithms may make use of the fact that LOS and NLOS channel measurements or CIRs look different from each other. Such differences may be numerically expressed through the values of relevant features extracted from CIRs. For example, NLOS CIRs may be associated with a higher delay spread, a less peaky CIR shape, a lower strongest-to-mean power ratio, a higher rise time, etc., compared to LOS CIRs.

However, the radio environment may vary among different scenarios depending on the size, distribution, and material of the objects/blockers in the environment, leading to differences in penetration, reflection, and diffraction of radio signals from such objects. Similarly, the amount of available bandwidth (BW), affects the shape of CIRs via determining the time resolution of CIRs, further affecting the features extracted from CIRs. As a result, the distinguishing ability of features exhibit differences across different available bandwidths and different scenarios.

Figure 3A:
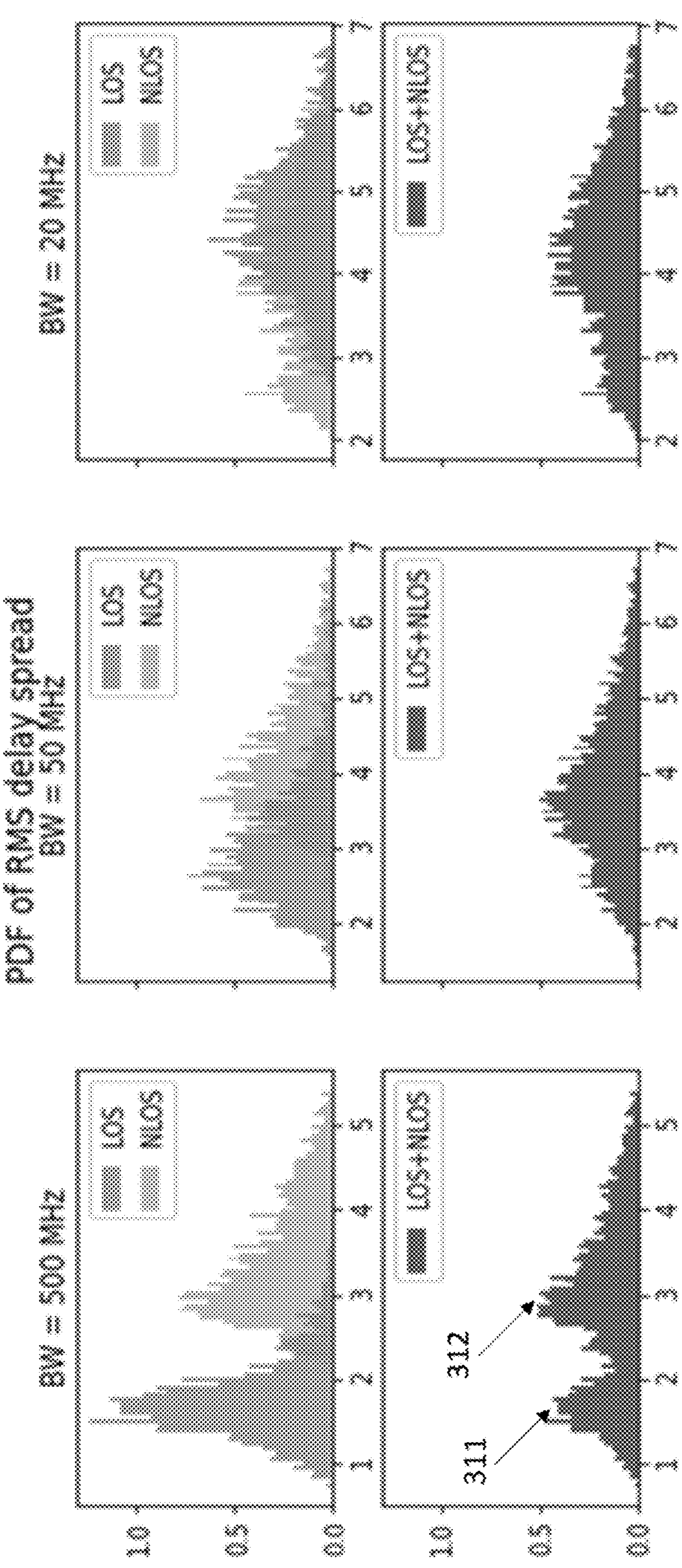
FIG. 3A illustrates an example of the distribution of root mean square delay spread for line-of-sight vs non-line-of-sight measurements with different available bandwidths in a first scenario.

FIG. 3A illustrates an example of the distribution (i.e., probability density function, PDF) of root mean square (RMS) delay spread for LOS vs NLOS measurements with different available bandwidths in a first scenario.

Figure 3B:
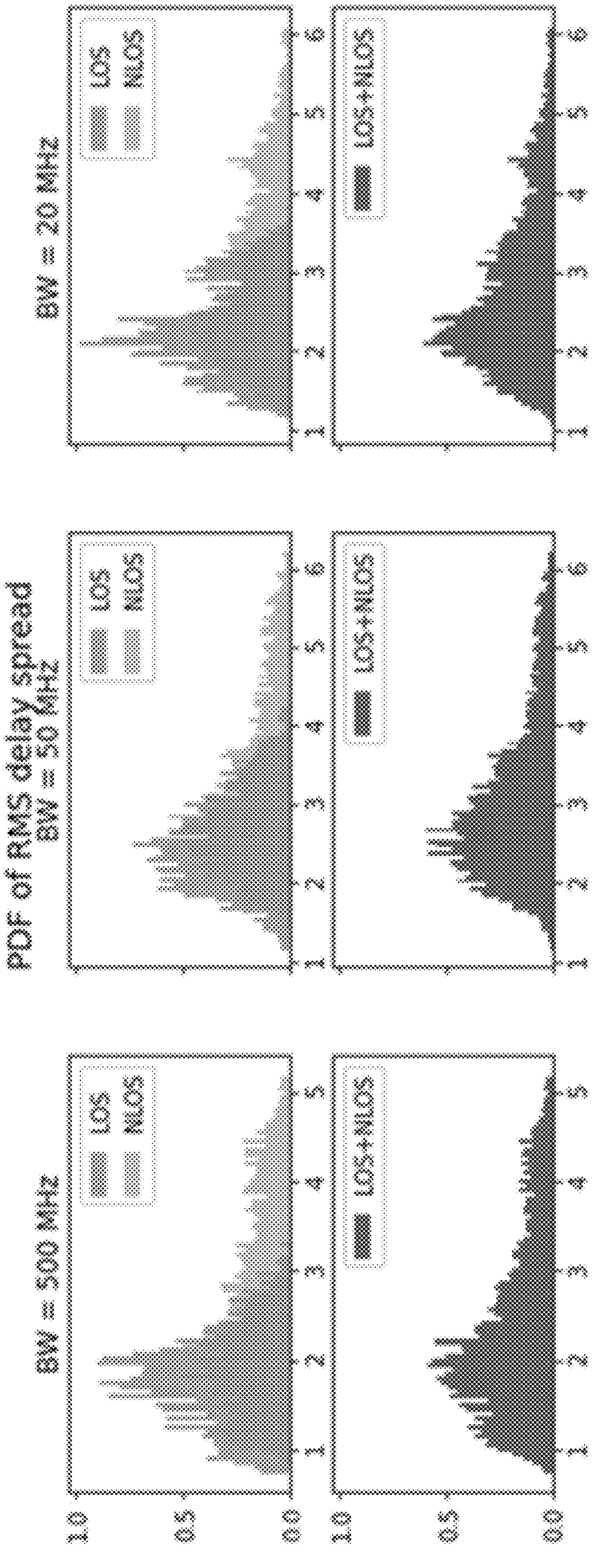
FIG. 3B illustrates an example of the distribution of root mean square delay spread for line-of-sight vs non-line-of-sight measurements with different available bandwidths in a second scenario.

FIG. 3B illustrates an example of the distribution (i.e., PDF) of RMS delay spread for LOS vs NLOS measurements with different available bandwidths in a second scenario.

In the first scenario of FIG. 3A, the RMS delay spread may be a distinguishing channel feature for LOS/NLOS classification, when 500 MHz of BW is available. However, its distinguishing ability may be degraded for 50 MHz or lower of BW in the first scenario of FIG. 3A. Notice the unlabeled measurements (LOS+NLOS) shown in FIG. 3A, where there are two clear peaks 311, 312 belonging to LOS and NLOS measurements for 500 MHz of BW, while there are no distinguishable peaks for 50 MHz or 20 MHz of BW. However, for the second scenario of FIG. 3B, the RMS delay spread is not a good classifier even for a 500 MHz of available BW (i.e., in FIG. 3B, there are no distinguishable peaks even for 500 MHz of BW).

To address this problem, some example embodiments provide a framework for a BW-dependent and/or scenario-dependent feature set selection and for the associated signaling among the network entities. In addition to improving the LOS/NLOS classification accuracy, such feature set selection mechanism may be relevant to specifying the input of the AI/ML model.

Some example embodiments are described below using principles and terminology of 5G technology without limiting the example embodiments to 5G communication systems, however.

FIGS. 4A and 4B may each illustrates a signaling diagram according to an example embodiment. The disclosure proposes classifying the channel measurements as LOS/NLOS to enhance the positioning performance. In other words, LOS/NLOS classification may be used to differentiate LOS channels from NLOS channels. Such classification outcome may be used during the position estimation, for example, by disregarding the NLOS measurements and prioritizing LOS measurements for selecting clean distance information. The illustrated examples are an extension or enhancement of UE-based or UE-assisted (LMF-based) positioning method, which a UE may be configured to measure DL PRS and determine the channel classification based on the assistance data that indicates the determined channel features best matching to the scenario (e.g., certain cell area) and channel bandwidth.

With the proposed extension, FIG. 4A may illustrate a method of direct AI/ML positioning through a network node (e.g., NG-RAN node) assisted positioning with a LMF-side model while FIG. 4B may illustrate a method of AI/ML assisted positioning through a network node (e.g., NG-RAN node assisted positioning with a gNB-side model. More specifically, the disclosed examples in FIGS. 4A and 4B each consider a case of UL positioning, whereby a network entity 420 (such as a gNB) may conduct the channel measurements by measuring an uplink reference (e.g., UL SRS) transmitted by one or more user devices (UEs 440). The network entity 420 (gNB) may be the entity that receives the assistance information (e.g., from LMF via NRPPa) and through the use of artificial intelligence/machine learning (AI/ML-based) to select or classify channel propagation into one of: LOS, NLOS, obstructed LOS or any new types to be used to describe propagation modes.

In general, the term "assistance information" may refer to the positioning-related information that contains the above-mentioned determined feature set/list (e.g., {{BW1: X MHz-BW2: Y MHz, {Feature Set1, rank/priority1}, {feature set2}, . . . }, {BW2: Y MHz-BW3: Z MHz, {Feature Set3, rank/priority1}, {feature set4}, . . . }, . . . }.), based on the BW and scenario.

Referring to FIG. 4A, in block 401, a network entity 430 such as a location server or location management function (LMF) may send a request to another network element 420 such as a gNB, to collect uplink (UL) channel information (such as channel measurements, packet data protocol (PDP) or CIR measurements) from one or more scenarios of interest. The term scenario may mean, for example, a cell, a set of specific cells, a cell sector, one or more indoor area, one or more areas with specific propagation conditions, etc. In other words, herein the scenarios may refer to different radio environment scenarios. These channel measurements may not need to be labeled as LOS/NLOS. Herein the term "channel" may refer to a radio channel.

In block 402, the network entity 420 (e.g., gNB) may report uplink channel information to the network entity 430 (e.g., LMF). In an example, the channel measurements may also be any radio measurement in general (i.e., not only on CIRs), which could be PDP, or time-consecutive set of radio measurements, e.g., mean value to be taken across 10 RSRP measurements collected with 10 ms interval, or taking statistics of time-based measurements, e.g., variance or 3rd order statistics of consecutive time of arrival (ToA) measurements collected with 100 ms interval.

In block 403, the network entity 430 may request environmental information (e.g., environmental type, UE density) from the network entity 420. In block 404, the network entity 420 may transmit a report of the requested environmental information to the network entity 430. In block 405, the network entity 430 may request capability information from the network entity 420. In block 406, the network entity 420 may report the capability information of the network entity 420 (e.g., gNB) or the capability information of one or more user device 440 to the network entity 430. In an example, the capability information may include one or more of: bandwidth capabilities and/or one or more configured bandwidth parts of the network entity 420 or the one or more user device 440 (e.g., UE). The bandwidth capability may refer to an available bandwidth at the network entity 420 or the one or more UE 440 for positioning. The network entity 420 or the UE 440 may be configured with one or more configured bandwidth parts (BWP) or carriers, each with its own UE channel bandwidth. The network entity 420 or the UE 440 may also report a computational capability of the network entity 420 or the UE 440 to the network entity 430.

In block 407, the network element 430 may determines a ranked feature set list based on the one or more configured BWPs reported by the network entity 420 or the UE 440 and the scenario of interest (e.g., for UEs residing in a specific set of cells, for UEs residing in specific indoor areas) in order to achieve high LOS/NLOS classification accuracy for the BWPs reported by the network entity 420 or the UE 440, based on LOS/NLOS distinguishing ability feature sets. The determination may be based further on the computational capability of the network entity 420 or the UE 440. The ranked feature set list may include a plurality of feature sets in a priority order or rank order (i.e., arrangement according to priority or rank). A given feature set may include one or more radio channel features.

For example, the priority order or rank order of the feature sets may be determined based on the resulting classification accuracy or positioning accuracy using each feature set, if labeled test data is available. As another example, the priority order or rank order of the feature sets may be determined based on separation/separability of LOS/NLOS classes in feature domain. In other words, the priority order or rank order of the plurality of feature sets may be based on one or a combination of: a classification accuracy using each of the plurality of feature sets, a positioning accuracy using each of the plurality of feature sets, or a separation or separability of the LOS and NLOS classes in a feature domain.

A given ranked feature set list may correspond to different BW capabilities and different scenarios of interest. Alternatively, or additionally, a given ranked feature set list may correspond to one or more carriers or frequency ranges (FR).

In block 408, the network entity 420 or the UE 440 may request a feature set list from the network entity 430 for the LOS/NLOS classification. The network entity 420 or the UE 440 may transmit the request via the LTE positioning protocol (LPP), for example. However, it should be noted that the request may be optional.

The network entity 420 or the UE 440 may also request the validity time of the feature set list, wherein the validity time may be based on a mobility condition of the network entity 420 or the UE 440. The validity time may indicate how long the feature set list is valid. This may be conveyed, for example, as a duration expressed in subframe numbers, for which the feature set list is valid, from the moment the message was received at the network entity 420 or the UE 440, or from the moment the network entity 420 or the UE 440 detects the PRS.

In block 409, the network entity 430 may transmit, or broadcast, the ranked feature set list to the network entity 420 or the UE 440. The ranked feature set list may be transmitted for example, in LPP assistance data information elements (IEs), i.e., directly from the network entity 430 (LMF) to the network entity 420 or the UE 440 via LPP. Alternatively, the network entity 430 may transmit the ranked feature set list to the serving network entity 420 (gNB) of the UE via the new radio positioning protocol A (NRPPa), and the network entity 420 gNB may then forward the ranked feature set list to the UE 440. The network entity 430 may also indicate the validity time of the ranked feature set list to the network entity 420 or the UE 440 based on mobility.

For example, a given feature or feature set in the ranked feature set list may be indicated by an identifier (e.g., feature ID #1) known by the network entity 420 or the UE 440, so that the network entity 420 or the UE 440 can interpret and calculate the feature(s). For this option, the network entity 420 or the UE 440 should have a pre-stored dictionary to match the signaled IDs to a feature or feature set that the network entity 420 or the UE 440 knows how to compute/calculate.

Alternatively, a given feature or feature set may be indicated together with information on how to retrieve or calculate it, for example: "Feature 1 calculated by sum (CIR)/std(CIR)". For this option as well, the network entity 420 or the UE 440 should know how to interpret the signaled information.

The network entity 430 may broadcast the ranked feature set list to the network entity 420 or the UE 440 in response to the request that may be received from the network entity 420 or the UE 440 for providing the feature set list. Alternatively, the network entity 430 may trigger the broadcast of new feature set lists corresponding to different BW capabilities, or periodically broadcast the information, depending on the dynamic changes in the radio environment.

In one example, the network entity 430 may determine the ranked feature set list based on a rough or coarse location of the network entity 420 or the UE 440, or based on radio measurements reported from the network entity 420 or the UE 440, which indicate the radio environment that the network entity 420 or the UE 440 is in. In case the network entity 420 or the UE 440 requests a feature set list from the network entity 430, the network entity 430 may signal a ranked feature set list to the network entity 420 or the UE 440 taking into account the one or more configured BWPs at the network entity 420 or the UE 440. For example, the signaled feature set may be in the following form: [{{feature set1, rank/priority1}, {feature set2, rank/priority2}, . . . } ]. This approach may be beneficial, since the ranked feature set list that the network entity 430 signals to a specific network entity 420 or the UE 440 matches with the capabilities of that network entity 420 or the UE 440. Consequently, the signaling is more efficient compared to a broadcasting approach, when there is a low number of network entity 420 or the UEs 440 with different capabilities.

Alternatively, the network element may broadcast one or more ranked feature set lists corresponding to different BW capabilities for example via system information broadcast or system information block (SIB) RRC signaling. For example, the network element may proactively broadcast one or more ranked feature set lists, wherein a given feature set is associated with one or more bandwidth values or bandwidth part values or bandwidth ranges and with certain radio environment scenarios (e.g., areas such as cells or indoor environments). That is, before receiving a request from the network entity 420 or the UE 440 to provide the feature set list, the network entity 430 may include the mapping association of feature sets to a range of bandwidth values into the PosSIB broadcast message, for example.

For example, the broadcasted feature set list with associated bandwidth part values and radio environment scenarios (areas) may be in the following form: [Area #1 (e.g., cells #1,2,3)-{{BW #1, {feature set1, rank/priority1}, {feature set2, rank/priority2}, . . . }, {BW #2, {feature set3, rank/priority1}, {feature set4, rank/priority2}, . . . }, . . . }, Area #2 (e.g., cells #4,5,6)-{{BW #1, {feature set5, rank/priority1}, {feature set6, rank/priority2}, . . . }, {BW #2, {feature set7, rank/priority1}, {feature set8, rank/priority2}, . . . }, . . . }, . . . ]

As another example, the broadcasted feature set list with associated bandwidth ranges (instead of a single bandwidth part value) may be in the following form: {{BW1: X MHz-BW2: Y MHz, {feature set1, rank/priority1}, {feature set2, rank/priority2}, . . . }, {BW2: Y MHz-BW3: Z MHz, {feature set3, rank/priority1}, {feature set4, rank/priority2}, . . . }, . . . }

This proactive broadcast of the feature set list allows the UE to readily adapt the use of feature sets to its BW conditions. In scenarios with a high density of UEs, broadcasting may be a more efficient solution compared to a high amount of one-to-one signaling with the network entity 420 or the UEs 440. Another benefit is faster configuration of feature sets at the network entity 420 or the UE 440 side, in case the UE 440 switches often from RRC_IDLE or RRC_INACTIVE state to RRC_CONNECTED (and vice versa), since in this case the steps of requesting and providing the feature set list do not need to be repeated. Another benefit is the faster adaptation of the used feature sets, in case the UE 440 needs to adjust the BW used for positioning. For example, for power saving purposes, the UE may use limited BW, but when the UE 440 reaches some specific area, the BW usage may need to be increased, and the UE 440 may need to quickly use a different feature set.

In block 410, the network entity 420 or the UE 440 selects a feature set from the received feature set list(s) for the LOS/NLOS classification corresponding to its configured BWP and coarse location according to the priority order or rank order. The feature set indicates one or more features of a radio channel. For example, the feature set may indicate at least one of the following features: RMS delay spread, average or total energy of one or more received channel responses or waveforms, kurtosis, mean excess delay, maximum amplitude of the one or more received channel responses or waveforms, rise time, skewness, Rician K-factor (or maximum power/amplitude divided by average power/amplitude), and/or standard deviation or variance of the one or more received channel responses or waveforms.

Herein kurtosis may be defined as a fourth standardized moment calculated as mean(X)^4/std(X)^4 where X may be CIR, for example. The kurtosis is a measure of "tailedness" of a distribution or a signal, sometimes also considered to be related to "peakedness".

The feature of RMS delay spread may be defined as follows: RMS delay spread is the standard deviation (or root-mean-square) value of the delay of reflections, weighted proportional to the energy in the reflected waves. A reflection is defined as a path of an estimated channel impulse response (CIR), where CIR is estimated using one or more PRS resources. The CIR is defined by a set of paths, each characterized by a complex gain and a delay, where the delay describes how much the signal is delayed when it travels over the respective propagation path, and the complex gain characterizes how the power of the signal is attenuated and how its phase is changed by the respective reflector. The RMS delay spread may be applicable for UEs in RRC_CONNECTED state conducting intra-frequency measurements, RRC_CONNECTED inter-frequency, and RRC_INACTIVE.

In block 407, the network entity 420 or the UE 440 obtains, or extracts, the feature set from one or more received signals and utilizes them for LOS/NLOS classification. The one or more received signals may refer to, for example, one or more received channel responses or waveforms. The LOS/NLOS classification means that the network entity 420 or the UE 440 classifies channel measurements or the one or more received signals (e.g., the one or more received waveforms) as line-of-sight or non-line-of-sight based on the extracted feature set. In other words, the network entity 420 or the UE 440 may classify any network entity 420 or the UE 440 measurements that are used for positioning purposes, wherein these measurements are shaped by the transmitted waveform and the channel. The LOS/NLOS classification may be done by the network entity 420 or the UE 440 per link with the gNB or TRP.

In block 408, the network entity 420 or the UE 440 may report the classification outcome to the network entity 430 (e.g., in case of network-based positioning). Alternatively, in case of UE-based positioning, the UE may not report the classification outcome to the network element since the location estimate is carried out at the UE.

For example, the network entity 430 or the network entity 420 or the UE 440 may then disregard the NLOS measurements and prioritize the LOS measurements, when estimating the location of the network entity 420 or the UE 440. As another example, the network entity 430 or network entity 420 or the UE 440 may give a lower weight to the NLOS measurements, when estimating the location of the network entity 420 or the UE 440. As another example, in block 410, the network entity 430 or the network entity 420 or the UE 440 may select a positioning algorithm based on the number or status of LOS and NLOS positioning measurements. As another example, the network entity 430 or the network entity 420 or the UE 440 may pre-process the LOS and NLOS measurements differently, for example: i) apply different algorithms when processing them for further parameter estimation, such as ToA/AoA estimation, or ii) apply mitigation to the NLOS measurements.

In block 412, the network entity 420 or the UE 440 may also report its currently used feature set to the network element. The network entity 430 may then check for a better feature set leading to a higher LOS/NLOS classification accuracy. For example, this report may be attached as an LPP measurement report IE, and sent simultaneously with the classification outcome.

In block 413, the network entity 420 or the UE 440 may proactively request or indicate the network entity 430 to update the current or previously reported feature set list. The update indication may be based on at least one of: the UE mobility conditions, radio channel conditions, or the delta calculation based on the estimated measurements and output of the AI/ML inference at the UE. The UE may transmit the update indication directly to the LMF over LPP. Alternatively, the UE may transmit the update indication using a MAC control element (CE) or uplink control information (UCI) to its serving gNB, which then forwards the update indication to the LMF over NRPPa.

In another example embodiment, the entity determining (computing) the feature set list(s) may be a user device 440 having sufficient memory and computational capability for determining the feature set list (instead of the entity being a network element such as an LMF). This user device 440 may signal the feature set list(s) to surrounding UEs via sidelink. Otherwise, such an example embodiment may be similar as described above with reference to FIG. 4.

FIG. 5 illustrates a flow chart according to an example embodiment of a method performed by an apparatus such as, or including, or included in, a user device 440. The user device 440 may also be called a subscriber unit, mobile station, remote terminal, access terminal, user terminal, terminal device, user equipment (UE), or target UE.

Since both FIGS. 4A and 4B involve the use of network node (e.g., NG-RAN node) assisted positioning (e.g., network entity 420 such as a gNB) to carry out common steps or sequences of operations to signal to either a network entity (e.g., LMF 430) or to one or more user devices (UE 440), the description of the steps or operations are therefore simplified.

In block 451, the network entity 420 (e.g., gNB) may send to a user device 440 a request for channel information (CIR, PDP etc.). In block 452, the user device 440 may report channel information to the network entity 420. In step 453, the entity 420 may send to the user device 440 a request for environment information (environment type, sidelink conditions). In block 454, the user device 440 may report information on environment to the network entity 420. In block 455, the network entity 420 may send a request to the user device 440 for capability information. In block 456, the user device 440 may send back a report of the capability information to the network entity 420. In step 457, the network entity 420 may determine ranked feature set list based on configured information such as the bandwidth part of the user device and environment scenario. In step 458, the user device 440 may send a request to the network entity 420 for a feature list. In block 459, the network entity 420 may send the feature list to the user device 440. In block 460, the user device 440 may select a feature from the feature set list. In step 461, the user device may extract selected features from the feature set list and utilize them for propagation condition classification (possibly subsequent positioning parameter estimation). In step 462, the user device may send a report to of the classification results to the network entity 420. In step 463, the network device 420 may be updated with the indication.

Referring to FIG. 5, in block 501, one or more feature set lists, each including a plurality of feature sets in a priority order or rank order, are received from a network entity 420 or the network element 440 or from another user device, wherein the one or more feature set lists are based on at least one of the following: one or more bandwidth parts configured for the apparatus, one or more bandwidth capabilities of the apparatus, or one or more radio environment scenarios.

The plurality of feature sets may be associated with a configured bandwidth part value or a bandwidth range per feature set of the plurality of feature sets.

In block 502, a feature set is selected from the plurality of feature sets based at least on the priority order or rank order. The feature set may be selected based further on at least one of the following: a configured bandwidth part of the apparatus, a bandwidth capability of the apparatus, a computational capability of the apparatus, and/or a radio environment that the apparatus is in. The configured bandwidth part of the apparatus may correspond to a configured bandwidth part value (BWP) or a bandwidth range associated with one of the feature sets. The radio environment may correspond to one of the one or more radio environment scenarios.

In block 503, the feature set is obtained, or extracted, from one or more received signals, wherein the feature set includes one or more radio channel features.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 6 illustrates a flow chart according to another example embodiment of a method performed by an apparatus such as, or including, or included in, a user device. The user device may also be called a subscriber unit, mobile station, remote terminal, access terminal, user terminal, terminal device, user equipment (UE), or target UE.

In this example embodiment, the user device receiving the feature set list(s) from the LMF may relay the feature set list(s) to another user device via sidelink.

Referring to FIG. 6, in block 601, one or more feature set lists, each including a plurality of feature sets in a priority order or rank order, are received from a network entity 430 such as an LMF, wherein the one or more feature set lists are based on at least one of the following: one or more bandwidth parts configured for the apparatus, one or more bandwidth capabilities of the apparatus, or one or more radio environment scenarios.

In block 602, a message indicative of the one or more feature set lists is transmitted, or relayed, to one or more other user devices via sidelink.

The apparatus may also perform blocks 502 and 503 of FIG. 5 in addition to blocks 601 and 602.

FIG. 7 illustrates a flow chart according to an example embodiment of a method performed by an apparatus such as, or including, or included in, a network element. The network element may be, for example, a location server, an LMF, or an access node such as a gNB. Alternatively, the apparatus, i.e., the entity determining (computing) the feature set list(s) may be a user device having sufficient memory and computational capability for determining the feature set list. This user device may signal the feature set list(s) to surrounding UEs via sidelink.

Referring to FIG. 7, in block 701, one or more feature set lists are determined based on at least one of the following: one or more bandwidth parts configured for one or more user devices, one or more bandwidth capabilities of the one or more user devices, or one or more radio environment scenarios associated with the one or more user devices, wherein the one or more feature set lists include a plurality of feature sets in a priority order or rank order.

In block 702, the one or more feature set lists are transmitted to the one or more user devices, wherein a feature set of the plurality of feature sets includes one or more radio channel features.

The plurality of feature sets may be associated with a configured bandwidth part value or a bandwidth range per feature set of the plurality of feature sets.

The blocks, related functions, and information exchanges (messages) described above by means of FIGS. 4-7 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

FIG. 8 illustrates an example embodiment of an apparatus 800, which may be an apparatus such as, or including, or included in, a user device. The user device may correspond to one of the user devices 100, 102 of FIG. 1. The user device may also be called a subscriber unit, mobile station, remote terminal, access terminal, user terminal, terminal device, user equipment (UE), or target UE.

The apparatus 800 includes at least one processor 810. The at least one processor 810 interprets computer program instructions and processes data. The at least one processor 810 may include one or more programmable processors. The at least one processor 810 may include programmable hardware with embedded firmware and may, alternatively or additionally, include one or more application-specific integrated circuits (ASICs).

The at least one processor 810 is coupled to at least one memory 820. The at least one processor is configured to read and write data to and from the at least one memory 820. The at least one memory 820 may include one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The at least one memory 820 stores computer readable instructions that are executed by the at least one processor 810 to perform one or more of the example embodiments described above. For example, non-volatile memory stores the computer readable instructions, and the at least one processor 810 executes the instructions using volatile memory for temporary storage of data and/or instructions.

The computer readable instructions may have been pre-stored to the at least one memory 820 or, alternatively or additionally, they may be received, by the apparatus, via an electromagnetic carrier signal and/or may be copied from a physical entity such as a computer program product. Execution of the computer readable instructions by the at least one processor 810 causes the apparatus 800 to perform one or more of the example embodiments described above. That is, the at least one processor and the at least one memory storing the instructions may provide the means for providing or causing the performance of any of the methods and/or blocks described above.

In a first exemplary embodiment, the apparatus 420, may include: at least one processor; and at least one memory storing instructions that, when executed by the at least one processor, cause the apparatus 420 at least to: receive from a network entity 430 or transmit to a user device 440, one or more feature set lists (block 409, 459 in FIG. 4A, B), each including a plurality of feature sets in a priority order or rank order associated with the apparatus 420 or the user device 440, wherein the one or more feature set lists are based on at least one of the following: one or more bandwidth parts configured for the apparatus 420 or the user device 440, one or more bandwidth capabilities of the apparatus 420 or the user device 440, or one or more radio environment scenarios associated with the apparatus 420 or the user device 440.

In implementation, the bandwidth parts may be contiguous or non-contiguous. In the case of contiguous, two or more adjacent component carriers form one single block of radio spectrum, whereas in non-contiguous component carriers are separated by a gap. In the embodiments, the network entity 430 that determines and provides the assistance information may be a LMF, or a core network entity such as a network data analytics function (NWDAF).

In the embodiments, the apparatus 420 may be a RAN/edge network entity such as a C-RAN or O-RAN entity, e.g., RAN Intelligent Controller (RIC), or a gNB. The apparatus as network entity 420 may also include a centralized RAN entity e.g., a C-RAN node or one of the NG-RAN nodes with AI/ML capability, where the AI/ML model is deployed while receiving measurements from non-AI/ML-capable TRPs.

The apparatus 420 is further caused to: classify or select channel measurements of the one or more received signals per measurement by the apparatus or by the user device (block 410 and 460 in FIGS. 4A, B), to estimate a likelihood of a propagation condition classification including one of: line-of-sight (LOS), non-line-of-sight (NLOS) and obstructed line-of-sight, based on the feature sets to determine positioning of the apparatus or the user device (block 411 or 461 in FIGS. 4A, B). In implementation, any radio measurement in general (i.e., not only on CIRs), which may be PDP, or time-consecutive set of radio measurements (e.g., mean value to be taken across 10 RSRP measurements collected with 10 ms interval, or taking statistics of time-based measurements, e.g., variance or 3rd order statistics of consecutive ToA measurements collected with 100 ms interval).

In a second exemplary embodiment, the apparatus 420, is caused to estimate intermediary features including one or more of: time of arrival (TOA), angle of arrival (AoA), time of flight (ToF), and range to be used for positioning of the apparatus 420 or the user device 440 (see blocks 411, 461 in FIGS. 4A, B). In an example, the estimation may include errors associated with these measurements (ToA, AoA, ToF, etc.) conducted previously.

In a third exemplary embodiment, the apparatus 420, the priority order or rank order of the plurality of feature sets is based on one or a combination of: a classification accuracy using each of the plurality of feature sets, a positioning accuracy using each of the plurality of feature sets, or a separation or separability of anyone of the propagation condition classification (e.g., the LOS, NLOS and obstructed LOS) in a feature domain (see blocks 408, 409 or 458, 459 in FIGS. 4A,B).

In a fourth exemplary embodiment, the apparatus 420 may be caused to: indicate to the network entity 430 or receive from the user device 440, an outcome of the channel measurement classification per measurement pertaining to the likelihood of the propagation condition classification and/or the estimated intermediatory feature (see blocks 412, 452 in FIGS. 4A, B).

In a fifth exemplary embodiment, the apparatus 420 is caused to: indicate to the network entity 430 or receive from the user device 440, uplink channel measurements including at least: channel impulse response (CIR), power delay profile (PDP) and Reference Signal Received Power (RSRP) (see blocks 402, 452 in FIGS. 4A, B).

In a sixth exemplary embodiment, the apparatus 420 is caused to: indicate to the network entity 430 or receive from the user device 440, one or more of: the bandwidth part, the bandwidth capability and computational capabilities (bandwidth part, bandwidth capability, and computation capability) within which signal measurements are performed by either the apparatus 420 or by the user device 440 (see blocks 406, 456 in FIGS. 4A, B).

In a seventh exemplary embodiment, the apparatus 420 is caused to: indicate to the network entity 430 or receive from the user device 440, conditions associated with the radio environment scenarios (user density, clutter density, density of objects-which can be deducted from SL conditions, hence: SL channel conditions, e.g., SL RSRP, SL CBR, etc. and contextual environment type or information, e.g., indoor/outdoor, office, factory, etc.) the apparatus 420 is serving or the user device 440 is located in, wherein the environmental scenarios including one or more of: user density, clutter density, sidelink (SL) channel conditions, sidelink reference signal received power (SL RSRP), sidelink channel busy ratio (SL CBR), and contextual environment type or information (see blocks 404, 454 in FIGS. 4A, B).

In an eighth exemplary embodiment, the apparatus 420, wherein the one or more feature set lists are based further on one or more frequency ranges, and wherein the feature set is selected based further on a frequency range used by the apparatus 430 or the user device 440.

In a ninth exemplary embodiment, the apparatus 420 is caused to: transmit, to the network entity 430 or receive from the user device 440, a request for the one or more feature set lists; and receive from the network entity 430 or transmit to the user device 440, the one or more feature set lists in response to transmitting or receiving the request (see blocks 408-409, 458-459 in FIGS. 4A, B).

In a tenth exemplary embodiment, the apparatus 420 is caused to: transmit, to the network entity 430 or receive from the user device 440, an indication for updating the one or more feature set lists (see blocks 413, 463).

In an eleventh exemplary embodiment of the apparatus 420, the one or more feature set lists are associated with a validity time based on a mobility condition of the apparatus 440, wherein the validity time indicates how long the one or more feature set lists are valid.

In a twelve exemplary embodiment, the apparatus 420 is caused to: report, to the network entity or receive a report from the user device 440, the feature set selected by the apparatus 420 (see blocks 412, 462 in FIGS. 4A, B).

In a thirteenth exemplary embodiment of the apparatus 420, wherein the one or more feature set lists include one or more identifiers per feature set of the plurality of feature sets and information on how to retrieve the plurality of feature sets.

In a fourteenth exemplary embodiment of the apparatus 420, the apparatus 420 relays the plurality of feature sets from a the network entity (430) to the user device 440, and the apparatus 420 is one of: a network node (gNB), a RAN/edge network entity, a RAN intelligent controller (RIC), a C-RAN node, and a NG-RAN node with AI/ML capability.

In a fifteenth exemplary embodiment of the apparatus 420, the network entity 430 is one of: a location management function (LMF), a core network node; a network data analytics function (NWDAF), and a RAN location management component.

In a sixteenth exemplary embodiment, the user device 440 transmits a message indicative of the one or more feature set lists via sidelink to another user device, or receive a message indicative of the one or more feature set lists via sidelink from another user device.

In a seventeenth exemplary embodiment, an apparatus 430 includes at least one processor, and at least one memory storing instructions which, when executed by the at least one processor, cause the apparatus 430 at least to: determine one or more feature set lists based on at least one of the following: one or more bandwidth parts configured for one or more network entity 420 or user device 440, one or more bandwidth capabilities of the one or more network entity or user device, or one or more radio environment scenarios associated with the one or more network entity 420 or the user device 440, wherein the one or more feature set lists include a plurality of feature sets possibly in a priority order or rank order; and transmit the one or more feature set lists to the one or more network entity 420 or the user device 440, wherein a feature set of the plurality of feature sets includes one or more radio channel features (see blocks 407, 409, 457, 459 in FIGS. 4A, B).

In an eighteenth exemplary embodiment, the apparatus 430 includes the one or more feature set lists are determined based further on a computational capability of the one or more network entity 420 or the user device 440 (see blocks 404, 454 in FIGS. 4A, B).

In a nineteenth exemplary embodiment, the apparatus 430. Wherein the transmission of the one or more feature set lists is triggered based on changes in a radio environment (see block 404, 454 in FIGS. 4A, B).

In a twentieth embodiment, a user device 440 includes: at least one processor; and at least one memory storing instructions that, when executed by the at least one processor, cause the user device 440 at least to: receive from a network entity 420, one or more feature set lists, each including a plurality of feature sets in possibly a priority order or rank order, associated with the user device 440, wherein the one or more feature set lists are based on at least one of the following: one or more bandwidth parts configured for the user device 440, one or more bandwidth capabilities of the user device 440, or one or more radio environment scenarios associated with the user device 440; and classify or select channel measurements of the one or more received signals per measurement to estimate a likelihood of a propagation condition classification including one of: line-of-sight (LOS), non-line-of-sight (NLOS) and obstructed line-of-sight, based on the feature sets to determine positioning of the user device 440 (see blocks 409, 410-411, 459, 460-461 in FIGS. 4A, B).

In a twenty first embodiment according to the user device 440, the network entity 420 relays the plurality of feature sets from another network entity 430 to the user device 440, and the network entity 420 includes one of: a network node (gNB), a RAN/edge network entity, a RAN intelligent controller (RIC), a C-RAN node, and a NG-RAN node with AI/ML capability.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 800 may further include, or be connected to, an input unit 830. The input unit 830 may include one or more interfaces for receiving input. The one or more interfaces may include for example one or more temperature, motion and/or orientation sensors, one or more cameras, one or more accelerometers, one or more microphones, one or more buttons and/or one or more touch detection units. Further, the input unit 830 may include an interface to which external devices may connect to.

The apparatus 800 may also include an output unit 840. The output unit may include or be connected to one or more displays capable of rendering visual content, such as a light emitting diode (LED) display, a liquid crystal display (LCD) and/or a liquid crystal on silicon (LCoS) display. The output unit 840 may further include one or more audio outputs. The one or more audio outputs may be for example loudspeakers.

The apparatus 800 further includes a connectivity unit 850. The connectivity unit 850 enables wireless connectivity to one or more external devices. The connectivity unit 850 includes at least one transmitter and at least one receiver that may be integrated to the apparatus 800 or that the apparatus 800 may be connected to. The at least one transmitter includes at least one transmission antenna, and the at least one receiver includes at least one receiving antenna. The connectivity unit 850 may include an integrated circuit or a set of integrated circuits that provide the wireless communication capability for the apparatus 800. Alternatively, the wireless connectivity may be a hardwired application-specific integrated circuit (ASIC). The connectivity unit 850 may include one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 800 may further include various components not illustrated in FIG. 8. The various components may be hardware components and/or software components.

The apparatus 900 of FIG. 9 illustrates an example embodiment of an apparatus such as, or including, or included in, a network element of a radio access network. The network element may also be referred to, for example, as a network node, a location server, a location management function (LMF), a radio access network (RAN) node, a next generation radio access network (NG-RAN) node, a NodeB, an eNB, a gNB, a base transceiver station (BTS), a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 900 may include, for example, a circuitry or a chipset applicable for realizing one or more of the example embodiments described above. The apparatus 900 may be an electronic device including one or more electronic circuitries. The apparatus 900 may include a communication control circuitry 910 such as at least one processor, and at least one memory 920 storing instructions which, when executed by the at least one processor, cause the apparatus 900 to carry out one or more of the example embodiments described above. Such instructions may, for example, include a computer program code (software) 922 wherein the at least one memory and the computer program code (software) 922 are configured, with the at least one processor, to cause the apparatus 900 to carry out some of the example embodiments described above. Herein computer program code may in turn refer to instructions which, when executed by the at least one processor, cause the apparatus 900 to perform one or more of the example embodiments described above. That is, the at least one processor and the at least one memory storing the instructions may provide the means for providing or causing the performance of any of the methods and/or blocks described above.

The processor is coupled to the memory 920. The processor is configured to read and write data to and from the memory 920. The memory 920 may include one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 920 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may include a configuration database for storing configuration data. For example, the configuration database may store a current neighbour cell list, and, in some example embodiments, structures of the frames used in the detected neighbour cells.

The apparatus 900 may further include a communication interface 930 including hardware and/or software for realizing communication connectivity according to one or more communication protocols. The communication interface 930 includes at least one transmitter (Tx) and at least one receiver (Rx) that may be integrated to the apparatus 900 or that the apparatus 900 may be connected to. The communication interface 930 may include one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 930 provides the apparatus with radio communication capabilities to communicate in the cellular communication system. The communication interface may, for example, provide a radio interface to one or more user devices. The apparatus 900 may further include another interface towards a core network entity such as an AMF and/or to the access nodes of the cellular communication system.

It is to be noted that the apparatus 900 may further include various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An access-node apparatus configured as a next generation Node B (gNB), the access node apparatus comprising:
- at least one processor; and
- at least one memory storing instructions that, when executed by the at least one processor, cause the access node apparatus at least to:
- receive, from a location management function (LMF) via a new radio positioning protocol A (NRPPa) message, one or more feature set lists, each comprising a plurality of feature sets in a priority order or rank order for uplink positioning of a target user equipment (UE), the one or more feature set lists comprising a mapping between:
  - (i) a plurality of bandwidth ranges or configured bandwidth part values,
  - (ii) (ii) a plurality of radio environment scenarios comprising at least one of an indoor area, a cell, a cell sector, or an area having specific propagation conditions, and
  - (iii) (iii) the plurality of feature sets arranged according to respective rank or priority values;
- receive an uplink sounding reference signal from the target UE;
- estimate a channel impulse response from the uplink sounding reference signal;
- extract, from the channel impulse response, each radio channel feature of the selected feature set, the selected feature set comprising at least root mean square delay spread, rise time, kurtosis, and a Rician K-factor or a strongest-to-mean power ratio;
- apply an artificial intelligence or machine learning classifier to the extracted radio channel features to classify channel measurements of the one or more received signals per measurement by the access node apparatus on a per-link and per-measurement basis as one of line-of-sight (LOS), non-line-of-sight (NLOS) or obstructed line-of-sight;
- estimate at least one intermediary positioning feature comprising at least one of time of arrival, angle of arrival, time of flight, or range using the channel measurement;
- weight the channel measurement differently based on whether the channel measurement is classified as line-of-sight, non-line-of-sight, or obstructed line-of-sight when determining positioning of the target UE; and
- transmit, to the LMF via NRPPa, a report comprising:
  - (i) an outcome of the classification,
  - (ii) an identifier of the selected feature set, and
  - (iii) the at least one intermediary positioning feature.

2. The access node apparatus according to claim 1, wherein the priority order or rank order of the plurality of feature sets is based on:
- a classification accuracy using each of the plurality of feature sets,
- a positioning accuracy using each of the plurality of feature sets, and
- a separation or separability of anyone of the propagation condition classification in a feature domain.

3. The access node apparatus according to claim 2, wherein the access node apparatus is further caused to:
- indicate to the network entity uplink channel measurements comprising at least: channel impulse response (CIR), power delay profile (PDP) and Reference Signal Received Power (RSRP).

4. The access node apparatus according to claim 3, wherein the one or more feature set lists are based further on one or more frequency ranges, and wherein the feature set is selected based further on a frequency range used by the access node apparatus or the user device.

5. The access node apparatus according to claim 4, wherein the access node apparatus is further being caused to:
- transmit, to the network entity or receive from the user device, a request for the one or more feature set lists; and
- receive from the network entity or transmit to the user device, the one or more feature set lists in response to transmitting or receiving the request.

6. The access node apparatus according to claim 5, wherein the access node apparatus is further being caused to:
- transmit, to the network entity or receive from the user device, an indication for updating the one or more feature set lists.

7. The access node apparatus according to claim 6, wherein the one or more feature set lists are associated with a validity time possibly based on a mobility condition of the access node apparatus, wherein the validity time indicates how long the one or more feature set lists are valid.

8. The access node apparatus according to claim 7, wherein the one or more feature set lists comprise one or more identifiers per feature set of the plurality of feature sets and information on how to retrieve the plurality of feature sets.

9. An apparatus configured as a location management function (LMF) comprising at least one processor, and at least one memory storing instructions which, when executed by the at least one processor, cause the apparatus at least to:

receive, from a next generation Node B (gNB), uplink channel information comprising channel impulse response information associated with uplink sounding reference signals transmitted by one or more target user equipments;

receive, from the gNB, capability information indicating one or more configured bandwidth parts or bandwidth capabilities of the one or more target user equipments;

receive, from the gNB, environmental information indicating a radio environment scenario associated with the one or more target user equipments;

determine one or more feature set lists based on the uplink channel information, the capability information, and the environmental information, wherein the one or more feature set lists comprise a plurality of feature sets in a priority order or rank order, the one or more feature set lists mapping:

(i) a bandwidth range or configured bandwidth part value, (ii) (ii) the radio environment scenario, and (iii) (iii) the plurality of feature sets arranged according to respective rank or priority values;

wherein the respective rank or priority values are based on at least one of classification accuracy, positioning accuracy, or separability of propagation-condition classes in a feature domain; and transmit the one or more feature set lists to the gNB via new radio positioning protocol A (NRPPa) for use in selecting a feature set to classify an uplink channel measurement as line-of-sight, non-line-of-sight, or obstructed line-of-sight, wherein a feature set of the plurality of feature sets comprises one or more radio channel features.

10. The apparatus according to claim 9, wherein the one or more feature set lists are determined based further on a computational capability of the one or more network entity or the user device.

11. The apparatus according to claim 9, wherein the transmission of the one or more feature set lists is triggered based on changes in a radio environment.

12. A user device, comprising:

at least one processor; and at least one memory storing instructions that, when executed by the at least one processor, cause the user device at least to:

receive, from a location management function (LMF) via a new radio positioning protocol A (NRPPa) message, one or more feature set lists, each comprising a plurality of feature sets in a priority order or rank order for uplink positioning of a target user equipment (UE), the one or more feature set lists comprising a mapping between:

(i) a plurality of bandwidth ranges or configured bandwidth part values, (ii) (ii) a plurality of radio environment scenarios comprising at least one of an indoor area, a cell, a cell sector, or an area having specific propagation conditions, and (iii) (iii) the plurality of feature sets arranged according to respective rank or priority values;

receive an uplink sounding reference signal from the target UE;

estimate a channel impulse response from the uplink sounding reference signal;

extract, from the channel impulse response, each radio channel feature of the selected feature set, the selected feature set comprising at least root mean square delay spread, rise time, kurtosis, and a Rician K-factor or a strongest-to-mean power ratio;

apply an artificial intelligence or machine learning classifier to the extracted radio channel features to classify channel measurements of the one or more received signals per measurement on a per-link and per-measurement basis as one of line-of-sight (LOS), non-line-of-sight (NLOS) or obstructed line-of-sight;

estimate at least one intermediary positioning feature comprising at least one of time of arrival, angle of arrival, time of flight, or range using the channel measurement;

weight the channel measurement differently based on whether the channel measurement is classified as line-of-sight, non-line-of-sight, or obstructed line-of-sight when determining positioning of the target UE; and transmit, to the LMF via NRPPa, a report comprising:

(i) an outcome of the classification, (ii) (ii) an identifier of the selected feature set, and (iii) (iii) the at least one intermediary positioning feature.

13. The access-node apparatus according to claim 1, wherein the respective rank or priority values of the plurality of feature sets are based:

(i) classification accuracy obtained using each of the plurality of feature sets, (ii) positioning accuracy obtained using each of the plurality of feature sets, or (iii) separation or separability of line-of-sight, non-line-of-sight, and obstructed line-of-sight classes in a feature domain.

14. The access-node apparatus according to claim 13, wherein each feature set of the plurality of feature sets is indicated in the ranked feature set list by a corresponding feature-set identifier, and wherein the ranked feature set list further comprises information indicating how to calculate at least one radio channel feature of the corresponding feature set from the channel impulse response.

15. The access-node apparatus according to claim 14, wherein the ranked feature set list is associated with a validity time based on a mobility condition of the target UE, the validity time indicating a duration for which the selected feature set is valid for classifying the uplink channel measurement.

16. The access-node apparatus according to claim 15, wherein the instructions further cause the access-node apparatus to transmit, to the LMF via NRPPa, an indication requesting an update of the ranked feature set list based on:

(i) a change in a mobility condition of the target UE, (ii) a change in a radio channel condition, and (iii) a change in the radio environment scenario indicated by the environmental information.

17. The access-node apparatus according to claim 16, wherein the report transmitted to the LMF further comprises:

(i) a confidence value or likelihood value associated with the outcome of the classification, (ii) a bandwidth part value or bandwidth range associated with the selected feature set, and (iii) an indication of the radio environment scenario used to select the selected feature set.

18. The access-node apparatus according to claim 17, wherein weighting the uplink channel measurement differently comprises assigning a first weight to the uplink channel measurement when classified as line-of-sight, assigning a second weight lower than the first weight when classified as obstructed line-of-sight, and assigning a third weight lower than the second weight when classified as non-line-of-sight.

19. The access-node apparatus according to claim 18, wherein the ranked feature set list is further based on one or more frequency ranges, and wherein selecting the selected feature set is further based on a frequency range used for transmission of the uplink sounding reference signal.

* * * * *